United States Patent
Whitney et al.

(10) Patent No.: US 11,781,495 B2
(45) Date of Patent: Oct. 10, 2023

(54) DUAL FUEL SYSTEM WITH ELECTRIC BATTERY FOR POWER GENERATION

(71) Applicant: RV Mobile Power, LLC, Columbus, OH (US)

(72) Inventors: Evan Whitney, Buchanan, MI (US); Mike Roll, West Bend, WI (US)

(*) Notice: Subject to any disclaimer, the term of this patent is extended or adjusted under 35 U.S.C. 154(b) by 0 days.

(21) Appl. No.: 17/562,202

(22) Filed: Dec. 27, 2021

(65) Prior Publication Data

US 2023/0258138 A1 Aug. 17, 2023

(51) Int. Cl.
| | |
|---|---|
| F02D 19/06 | (2006.01) |
| F02D 41/00 | (2006.01) |
| F02B 69/04 | (2006.01) |
| F02B 63/04 | (2006.01) |
| B60P 3/36 | (2006.01) |
| B60K 25/02 | (2006.01) |

(52) U.S. Cl.
CPC .......... *F02D 19/0647* (2013.01); *F02B 63/04* (2013.01); *F02B 69/04* (2013.01); *F02D 19/0615* (2013.01); *F02D 41/0027* (2013.01); *B60K 25/02* (2013.01); *B60P 3/36* (2013.01); *F02D 2200/0611* (2013.01); *F02D 2200/101* (2013.01)

(58) Field of Classification Search
CPC .... F02B 63/042; F02B 69/04; F02D 19/0613; F02D 19/0647; F02D 41/0027
See application file for complete search history.

(56) References Cited

U.S. PATENT DOCUMENTS

| | | | |
|---|---|---|---|
| 4,165,727 A | 8/1979 | Fitzner et al. | |
| 6,737,762 B2 | 5/2004 | Koenig | |
| 7,615,877 B2 | 11/2009 | Willets et al. | |
| 9,065,300 B2 | 6/2015 | Williams | |
| 9,494,089 B1* | 11/2016 | Lorts ................. | F02M 21/0239 |
| 10,167,789 B2 | 1/2019 | Collie et al. | |
| 10,221,780 B2 | 3/2019 | Sarder et al. | |
| 10,393,034 B2 | 8/2019 | Collie et al. | |
| 2006/0103239 A1* | 5/2006 | Kishibata ........... | F02D 41/0205 307/10.1 |
| 2011/0042964 A1* | 2/2011 | Kitch ..................... | F02D 29/06 290/1 B |

(Continued)

FOREIGN PATENT DOCUMENTS

| | | |
|---|---|---|
| CA | 2979453 A1 | 4/2018 |
| CN | 204126741 U | 1/2015 |

(Continued)

*Primary Examiner* — Logan M Kraft
*Assistant Examiner* — Anthony L Bacon
(74) *Attorney, Agent, or Firm* — Tyler S. Dunham, Esq.

(57) ABSTRACT

The exemplary embodiments herein provide a dual fuel system with a recreational vehicle electric battery for use with a power generation assembly. The system comprises a combustion engine with a stator assembly for generating power and further having a gasoline pump, an LP shutoff valve, and a carburetor valve. The system further comprises a recreational vehicle battery, a DC rectifier in electrical communication with the stator assembly, a fuel selection switch, and a digital fuel valve control module (DFVCM). Multiple fuels are safely controlled while interchanging power between a battery and the DC rectifier.

18 Claims, 8 Drawing Sheets

(56) References Cited

U.S. PATENT DOCUMENTS

| | | | | |
|---|---|---|---|---|
| 2012/0168023 | A1* | 7/2012 | Folken | F02C 9/26 |
| | | | | 141/59 |
| 2013/0214602 | A1* | 8/2013 | Frohman | H02J 3/472 |
| | | | | 307/52 |
| 2015/0330321 | A1* | 11/2015 | Lucht | F02D 29/06 |
| | | | | 701/104 |
| 2018/0080392 | A1* | 3/2018 | Janscha | F02D 41/0027 |
| 2018/0167002 | A1* | 6/2018 | Frampton | H02M 5/271 |
| 2018/0223764 | A1* | 8/2018 | Marrack | F02D 41/3082 |
| 2019/0078519 | A1 | 3/2019 | Sarder et al. | |
| 2020/0123972 | A1* | 4/2020 | Harknett | F02D 41/0025 |
| 2022/0239193 | A1* | 7/2022 | Byaliy | H02K 13/12 |

FOREIGN PATENT DOCUMENTS

| | | |
|---|---|---|
| CN | 105840324 A | 8/2016 |
| CN | 205779275 U | 12/2016 |
| CN | 105863884 B | 7/2018 |
| EP | 2380768 A1 | 10/2011 |
| EP | 1306958 B1 | 11/2016 |

* cited by examiner

GASOLINE OPERATION
(DF Switch Gasoline) 90

| | Engine Off | Engine Start | Engine Run | | ENGINE 80 STATE |
|---|---|---|---|---|---|
| 20 Gasoline Pump | ON | ON | ON | | |
| 40 LP Shut Off Valve | OFF | OFF | OFF | | |
| 10 Carburetor Valve | OFF | ON | ON | | |
| 30 Primer Switch | ON | ON | OFF | | |
| 70 RV Battery | ON | ON | OFF | | |
| 50 GEN Rectifier | OFF | OFF | ON | | |

FIGURE 8A

LP OPERATION
(DF Switch LP) 90

| | Engine Off | Engine Start | Engine Run | | ENGINE 80 STATE |
|---|---|---|---|---|---|
| 20 Gasoline Pump | OFF | OFF | OFF | | |
| 40 LP Shut Off Valve | OFF | ON | ON | | |
| 10 Carburetor Valve | OFF | OFF | OFF | | |
| 30 Primer Switch | OFF | ON | OFF | | |
| 70 RV Battery | ON | ON | OFF | | |
| 50 GEN Rectifier | OFF | OFF | ON | | |

FIGURE 8B

DUAL FUEL SYSTEM WITH ELECTRIC BATTERY FOR POWER GENERATION

CROSS-REFERENCE TO RELATED APPLICATIONS

This application does not claim priority to any co-pending applications.

TECHNICAL FIELD

Embodiments generally relate to multi-fuel systems for electric generators designed to operate temporarily with a battery.

BACKGROUND OF THE ART

Outdoor recreation remains one of the most popular activities in America and the Recreational Vehicle (RV) industry continues to innovate on the types of fuels that can be used, fuel efficiency, safety and the incorporation of new renewable power sources (solar panels and batteries) into RV electrical systems. RV owners want flexibility in the types of power sources consumed by their vehicles, and they want this flexibility to be easy to use and safe to operate, even for inexperienced RV enthusiasts. It is desirable to create a generator with associated fuel controls that would be capable of utilizing multiple different fuel sources in addition to at least one electric battery.

SUMMARY OF THE EXEMPLARY EMBODIMENTS

Exemplary embodiments provide digital fuel valve control module that communicates with various components to safely manage the power distributed to selected subassemblies of a combustion engine. During the priming and starting of the engine, power is drawn from an RV battery to run controls for a gasoline pump to prime the engine. Once the engine starts and power generation is stable, the system switches supply power from the RV battery to a DC rectifier. If improper data is coming from the DC rectifier or from the engine RPM sensor, the system can quickly stop the flow of all fuel to the engine. Two different types of fuel can be used within the combustion chamber of the engine, and the system allows a user to safely and quickly switch between fuel types. The power generated by the stator assembly is primarily sent to an AC filter and breaker box for various RV components but some is routed to a DC rectifier for operating components of the combustion engine during power generation.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 8A is a software chart of the operation modes of the digital fuel valve control module based on states of the engine and the selection of gasoline from the dual fuel selection switch.

FIG. 8B is a software chart of the operation modes of the digital fuel valve control module based on states of the engine and the selection of LP gas from the dual fuel selection switch.

DETAILED DESCRIPTION

Figure 1:
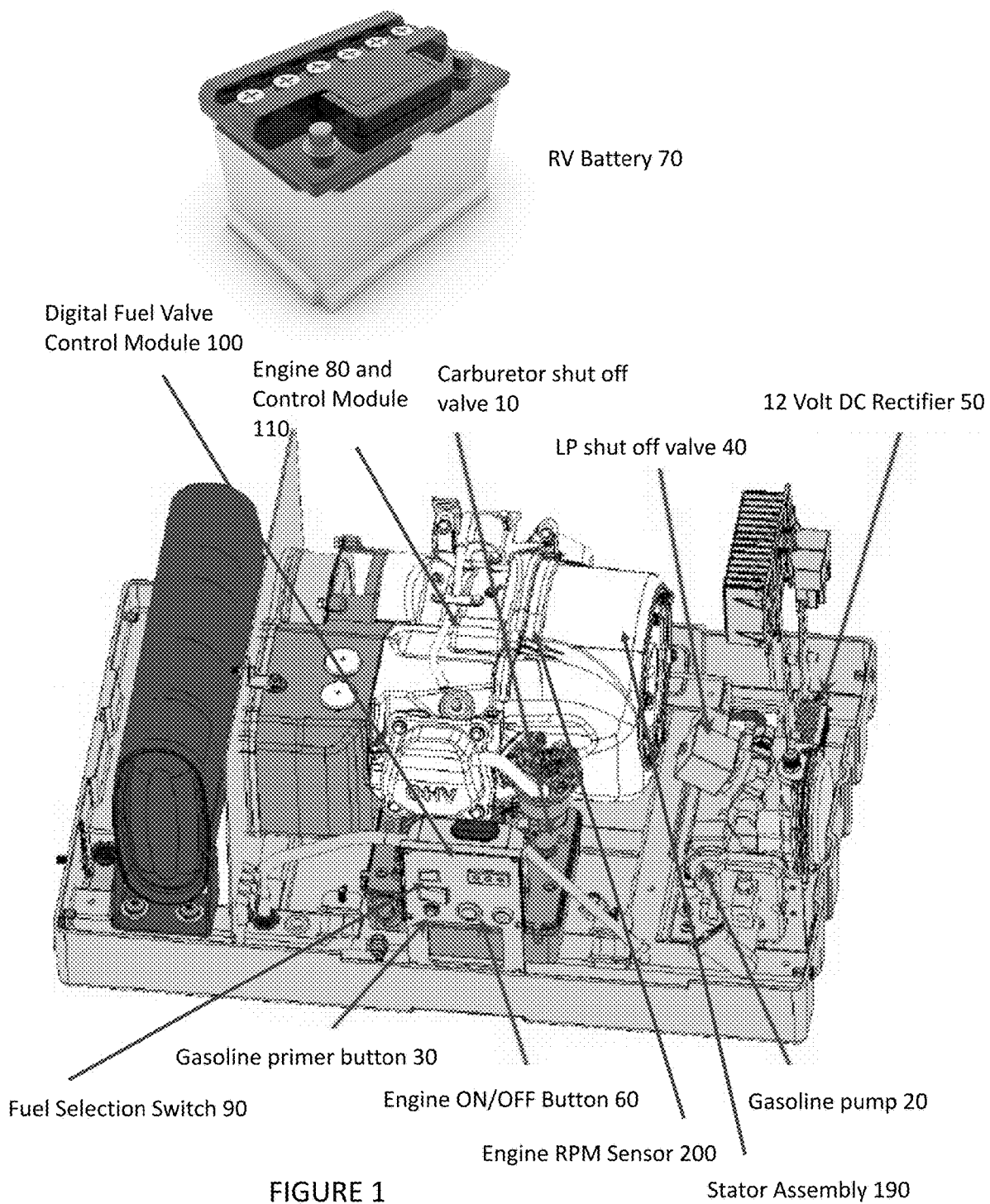
FIG. 1 is a front projection view of an exemplary embodiment of the dual fuel generator system and battery.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a front projection view of an exemplary embodiment of the dual fuel generator system and battery 70. In this embodiment, the digital fuel valve control module (DFVCM) 100 is positioned near a fuel selection switch 90 which allows the user to select between at least two different fuel types for the combustion engine 80. In this embodiment the two fuel types are preferably LP gas and gasoline, which are labeled on the switch 90 for selection by the user. With the exemplary embodiments described herein, a user can switch fuel types at any point and continue to start/run the engine 80 and generate power safely. Whether in the off, starting, or on 'state' the switch 90 allows the user to switch instantly between LP gas and gasoline and ensures that the engine 80 starts quickly and safely and/or continues to run on the new fuel type.

A gasoline primer button 30 will allow the DFVCM 100 to send power (preferably RV battery power 70) to the gasoline pump 20 in order to draw gasoline into the carburetor. The supply of gasoline to the engine 80 is further controlled by a shut off valve 10 placed in the carburetor which opens and closes to allow and prevent gasoline from entering the combustion chamber of the engine 80. An engine on/off button 60 allows the user to start and stop the engine accordingly, by triggering a series of functions in the DFVCM 100 to either quickly initiate fuel sources or quickly seal them off.

An engine RPM sensor 200 is preferably placed inside the engine 80 to determine the approximate RPMs of the engine 80. In some embodiments, the engine RPM data is sent to the DFVCM 100 so that the engine 80 status can be used to determine the fuel requirements, or in some cases cutting off all fuel to the engine 80.

A stator assembly 190 is positioned in mechanical connection with the drive shaft of the engine 80 to produce electrical power as the engine drive shaft rotates. While most of the power produced by the stator assembly 190 is sent to an AC filter and eventual AC breaker panel 195 for the RV components (AC, heat, water pumps, lights, outlets, etc) some of the power produced is routed to a 12 volt DC rectifier 50.

When the user selects LP gas as the fuel source from the fuel selection switch 90, an LP shut off valve 40 is used to control the flow of LP gas into the combustion chamber of the engine 80. When the user selects gasoline as the fuel source, the LP shut off valve 40 remains closed during all operations. Preferably, a normally closed shut off valve is used so that when no power is applied to the valve 40 it remains shut, and LP gas is only released if power is applied to the valve 40. Similarly, the carburetor shut off valve 10 is also preferably a normally closed shut off valve so that when no power is applied the valve is shut, and gasoline is only released if power is applied to the valve 10. Both the LP shut off valve 40 and the carburetor shut off valve 10 would preferably be actuated by mechanical/electric solenoids.

During startup of the engine 80, power from the RV battery 70 is used by the DFVCM 100 to control the gasoline pump 20 and carburetor shut off valve 10 when gasoline is selected at the switch 90. Otherwise, during startup of the engine 80, power from the RV battery 70 is routed by the DFVCM 100 to the LP shut off valve 40 when LP gas is selected at the switch 90.

Figure 2:
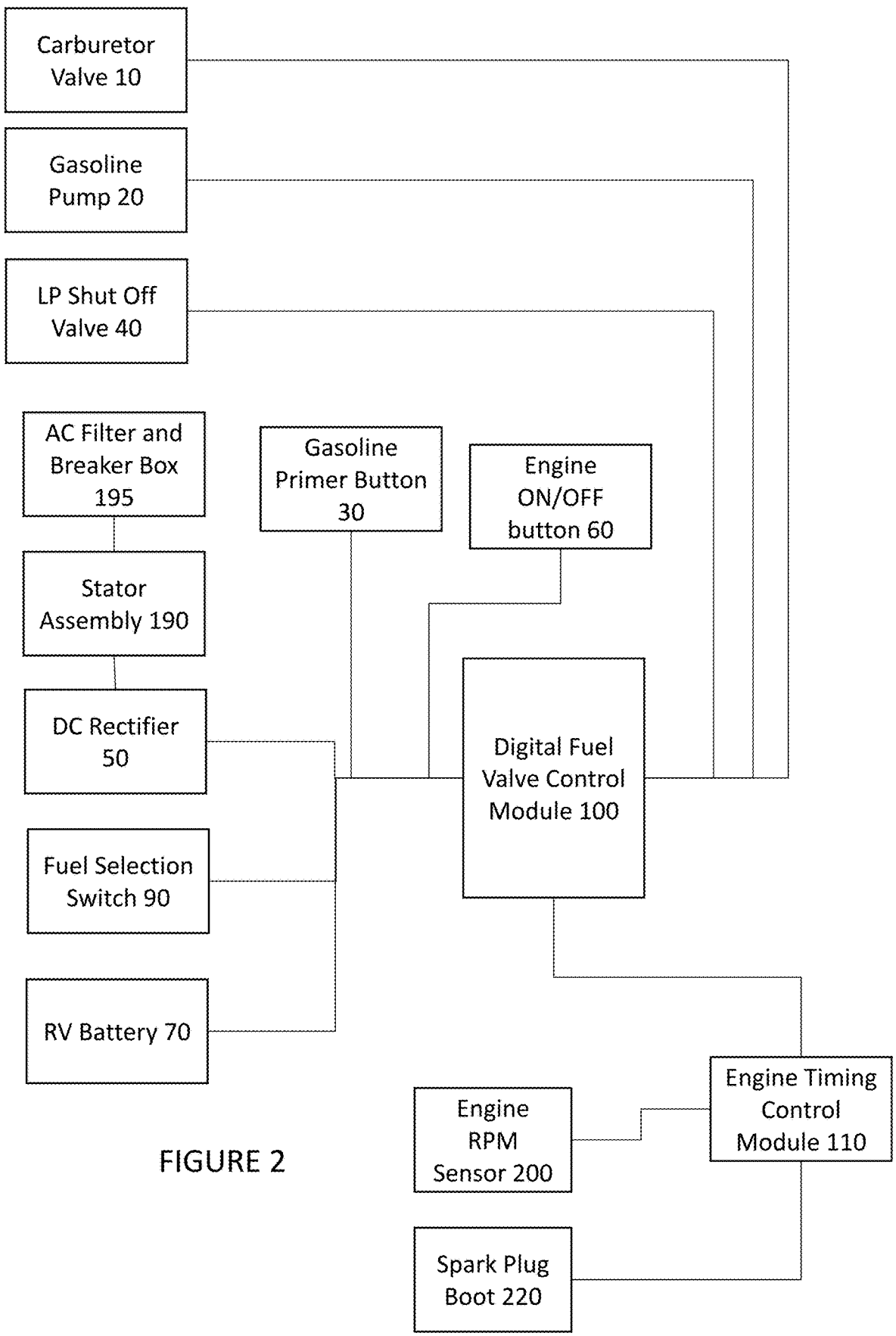
FIG. 2 is an electrical block diagram of an exemplary embodiment of the dual fuel generator system and battery.

FIG. 2 is an electrical block diagram of an exemplary embodiment of the dual fuel generator system and battery. The DFVCM 100 is in electrical communication with the engine on/off button 60, gasoline primer button 30, DC rectifier 50, fuel selection switch 90, and the RV battery 70. In some embodiments, the DFVCM 100 is also in electrical communication with an engine timing control module 110 which can allow the DFVCM 100 to make adjustments based on data coming from the engine 80, in some cases shutting down when the engine 80 does not appear to be operating properly. In some embodiments, the engine timing control module 110 is in electrical communication with an engine RPM sensor 200 that send data regarding the RPMs of the engine 80 to the engine timing control module 110 which could then be passed to the DFVCM 100 if desired. Also in some embodiments, a spark plug boot 220 is also in electrical communication with the engine timing control module 110 which can be used to control the ignition of combustion within the engine 80.

DFVCM 100 is also in electrical communication with the carburetor valve 10, gasoline pump 20, and LP shut off valve 40 and is adapted to pass power to these devices from either the RV battery 70 or the DC rectifier 50, depending on the state of the engine 80 and various other parameters. The DC rectifier 50 is in electrical communication with the stator assembly 190 which generates power based on rotations of the driveshaft of the engine 80.

Figure 3:
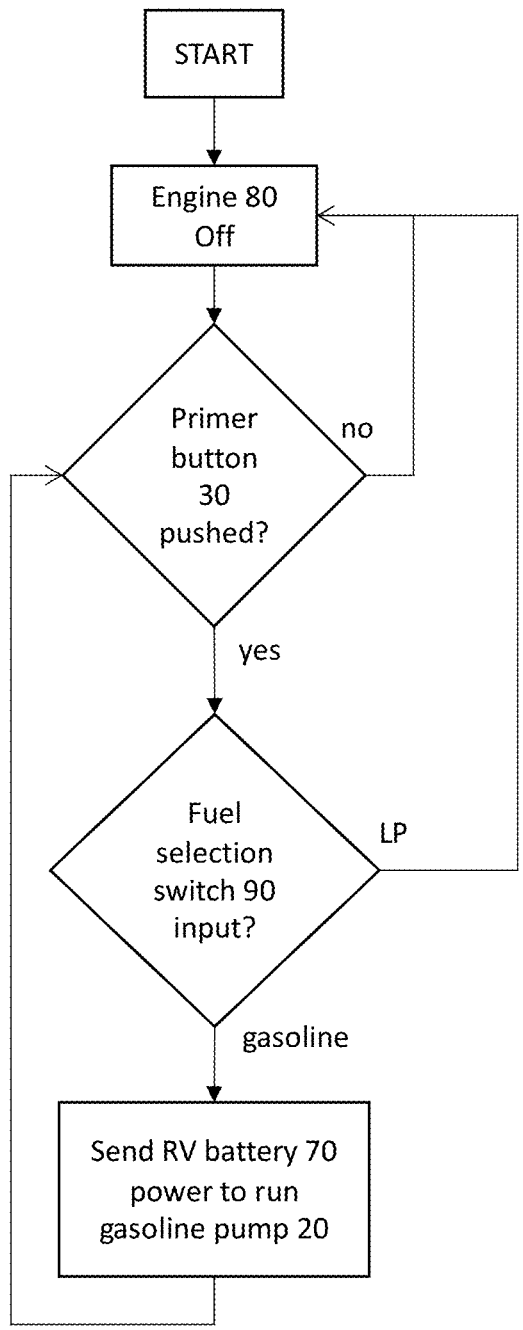
FIG. 3 is a logic flowchart for an exemplary embodiment of the software logic operating in the dual fuel valve control module when the user is priming the engine with gasoline.

FIG. 3 is a logic flowchart for an exemplary embodiment of the software logic operating in the DFVCM 100 when the user is priming the engine 80 with gasoline. When attempting to start a dry engine 80, it is desirable to 'prime' the engine by drawing gasoline into the fuel lines, which helps the engine 80 start faster. In the initial state, the engine 80 is off and the DFVCM 100 checks to see if the primer button 30 has been pushed. If yes, and if the user has selected gasoline as the fuel type with switch 90, the DFVCM 100 sends RV battery 70 power to run the gasoline pump 20 and immediately returns to see if the button 30 is still pushed. In this way, the gasoline pump 20 runs on RV battery 70 power until the user removes their finger (pressure) from the primer button 30. Note that the primer switch 30 is still powered even during starting of the engine (see FIG. 8A). Once the engine is running, there is no power to the primer switch 30, whether in gasoline mode or LP mode. If the button 30 is not pushed, the DFVCM 100 takes no action and returns to check the status of the primer button 30 again.

If the primer button 30 is pushed but LP gas is selected as the fuel type the DFVCM 100 takes no action and returns to check the status of the primer button 30 again. However, as shown below in FIG. 8B, the power to the primer switch 30 preferably remains ON even when attempting to start the engine on LP gas even though the gasoline pump 20 would not run in LP mode. However, when a user wants to quickly switch fuel types while also attempting to start the engine, having power already going to the primer switch 30 allows the user to more quickly prime the engine when switching fuels during starting. Note that the pump 20 remains off until the switch 90 is changed to gasoline, but the system is ready for a quick changeover.

When the gasoline pump 20 runs during priming, it is preferable that the pump 20 runs full on, to get gasoline into the engine 80 as quickly as possible. A float is positioned within the carburetor of the engine 80 to ensure that once the adequate amount of gasoline has been pumped into the carburetor, no additional gasoline can enter the carburetor and flood the engine. In this way, the pump 20 can instantly run full on (full power) during priming so that the engine 80 starts as quickly as possible without the fear of flooding the carburetor.

Figure 4:
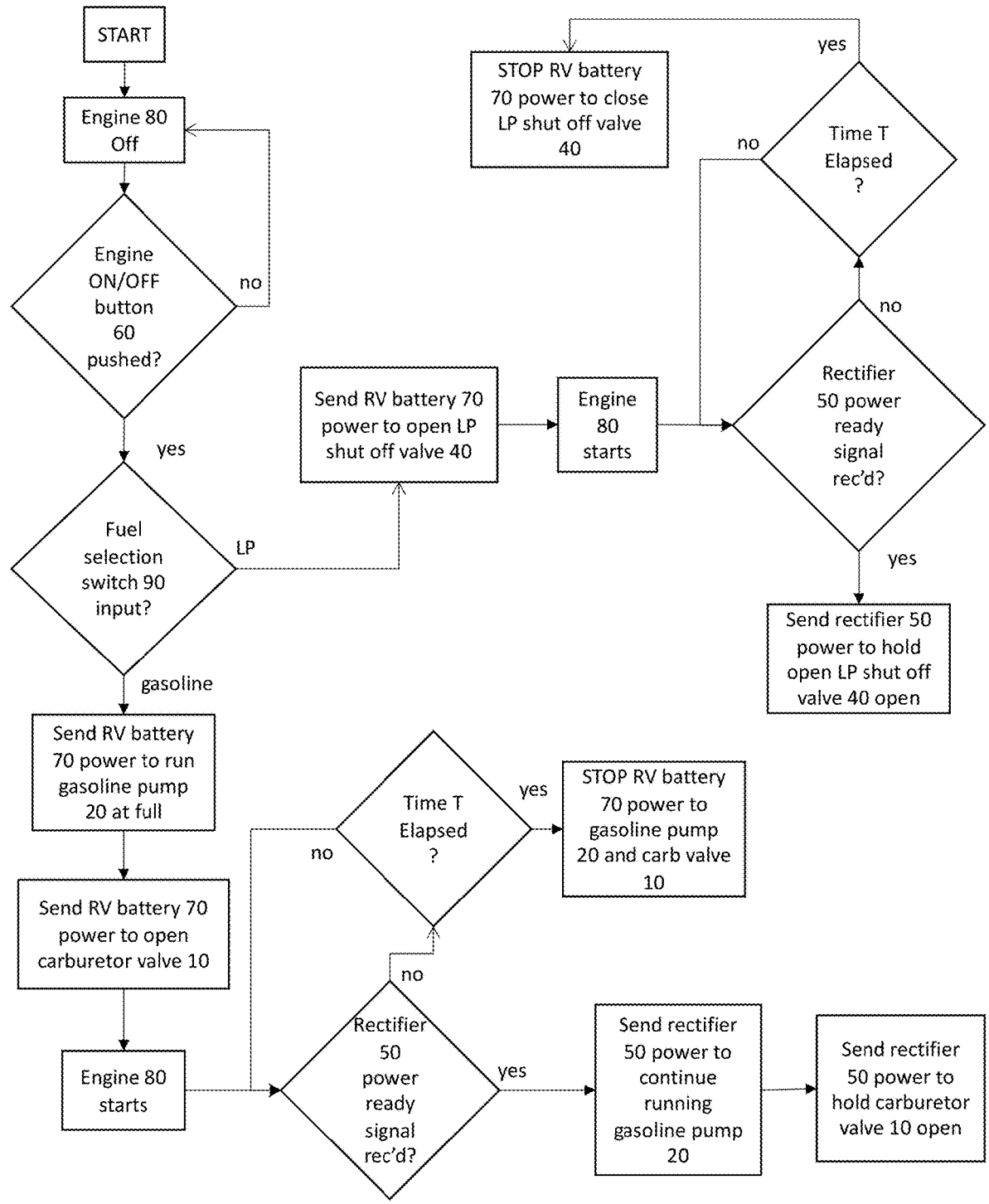
FIG. 4 is a logic flowchart for an exemplary embodiment of the software logic operating in the dual fuel valve control module when the user is starting the engine and beginning to draw power from the DC rectifier.

FIG. 4 is a logic flowchart for an exemplary embodiment of the software logic operating in the DFVCM 100 when the user is starting the engine 80 and beginning to draw power from the DC rectifier 50. In the initial state, the engine 80 is off and the DFVCM 100 checks to see if the engine on/off button 60 has been pushed. If no, the DFVCM 100 returns to re-check the engine on/off button 60 again. If yes, the DFVCM 100 checks the fuel selection switch 90 to determine if LP gas or gasoline have been selected as the currently desired fuel source.

If LP gas is selected by the switch 90, RV battery 70 power is sent to open the LP shut off valve 40. Following this, the engine 80 starts and this can be accomplished in a number of ways. In one embodiment, the DFVCM 100 would send a 'start' signal to the engine 80 (preferably through the timing control module 100) which could then initiate a spark to the spark plug boot 220. Following this, the DFVCM 100 begins to look for a 'ready' signal from the DC rectifier 50 which indicates to the DFVCM 100 that the rectifier 50 is producing 12 VDC power. If the 'ready' signal is received, the power supplied to the LP shut off valve 40 is immediately switched from RV battery 70 power to DC rectifier 50 power, as the engine 80 continues to run on LP gas. If the 'ready' signal is not received by the DFVCM 100 within a time period (T) the DFVCM 100 stops sending RV battery 70 power to the LP shut off valve 40 to stop all flow of LP gas into the combustion chamber of the engine 80. A 'ready' signal can comprise any predetermined electrical signal, pulse, voltage, or current that is expected at the DFVCM 100 and indicates that the DC rectifier 50 is operating properly and ready to deliver power.

If gasoline is selected by the switch 90, RV battery 70 power is sent to run the gasoline pump 20 immediately at full, to quickly fill the supply lines to the carburetor with a float positioned within the carburetor to ensure that it does not flood. Additionally, RV battery 70 power is sent to open the carburetor valve 10 to allow gasoline to enter the carburetor and quickly start the engine, which as mentioned above, can be accomplished in a number of ways. In one embodiment, the DFVCM 100 would send a 'start' signal to the engine timing control module 100, which could then initiate a spark to the spark plug boot 220. Following this, the DFVCM 100 begins to look for a 'ready' signal from the DC rectifier 50 which indicates to the DFVCM 100 that the rectifier 50 is producing 12 VDC power. If the 'ready' signal is received, the power supplied to the gasoline pump 20 and carburetor valve 10 is immediately switched from RV battery 70 power to DC rectifier 50 power, as the engine 80 continues to run on gasoline. If the 'ready' signal is not received by the DFVCM 100 within a time period (T) the DFVCM 100 stops sending RV battery 70 power to the gasoline pump 20 and carburetor valve 10 to stop all flow of gasoline into the combustion chamber of the engine 80.

Figure 5:
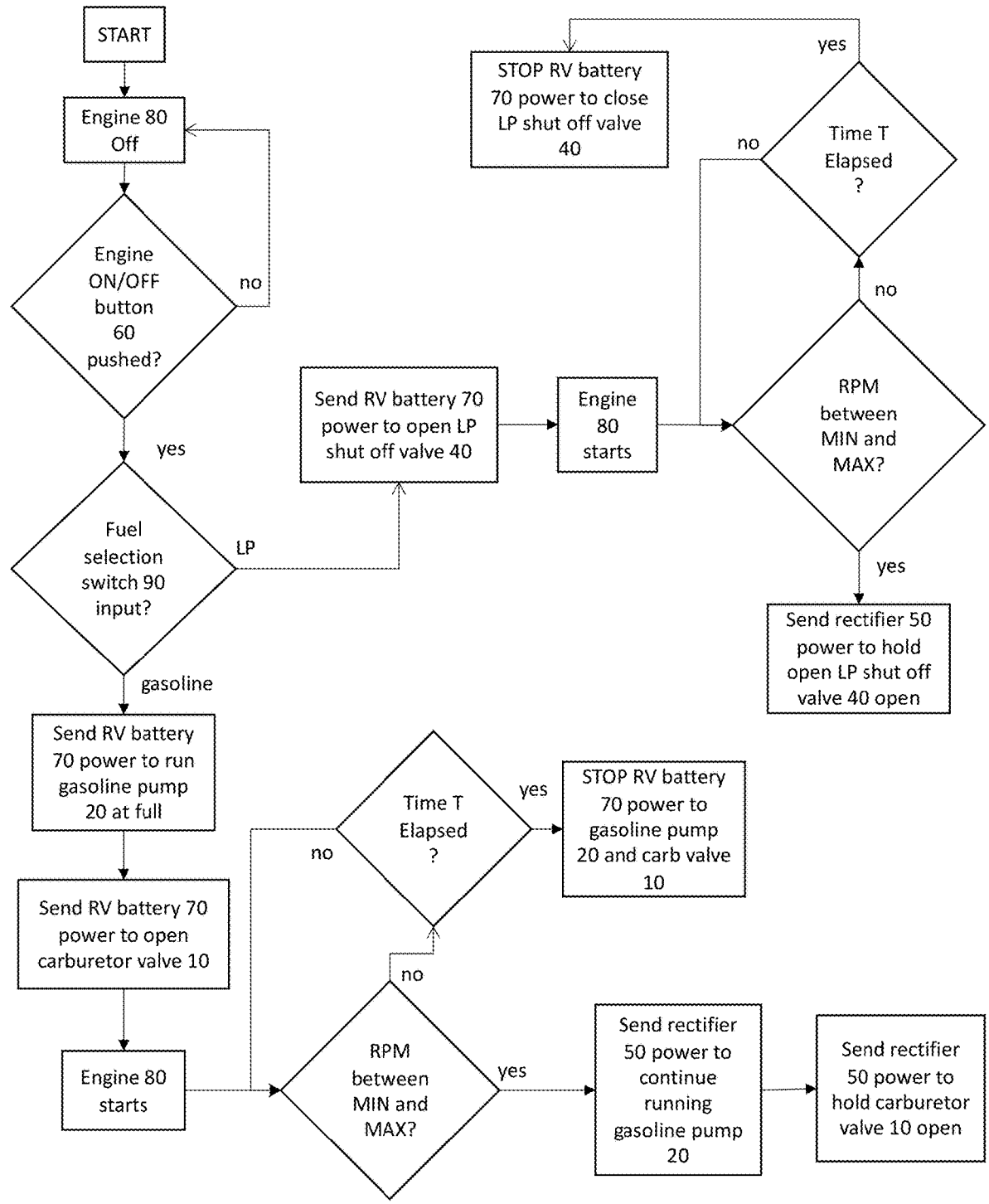
FIG. 5 is a logic flowchart for an alternative embodiment of the software logic operating in the dual fuel valve control module when the user is starting the engine and beginning to draw power from the DC rectifier.

FIG. 5 is a logic flowchart for an alternative embodiment of the software logic operating in the DFVCM 100 when the user is starting the engine and beginning to draw power from the DC rectifier 50. In this embodiment, many of the steps are similar to above, with the notable exception that the DFVCM 100 now examines the RPMs of the engine 80 rather than the DC rectifier 50, in order to determine proper operation status.

Whether LP gas or gasoline is selected by switch 90, after attempting to start the engine 80, the DFVCM 100 would receive data from the engine RPM sensor 200 through the engine timing control module 110 to determine if the RPMs are too high or too low (i.e. outside of an acceptable range). If the engine 80 is operating normally, the RPMs should be within the bounds of a lower limit (MIN) and upper limit (MAX) that would represent normal expected operations. Below the lower limit or above the upper limit would indicate some type of failure in the engine 80, and if this condition is read by the DFVCM 100 consistently for time period (T), the DFVCM 100 would stop sending RV battery 70 power to the LP shut off valve 40 if LP gas is selected (or stop sending RV battery 70 power to the gasoline pump 20 and carburetor valve 10 if gasoline is selected).

Some embodiments may use a combination of the logic shown in FIG. 4 with the logic shown in FIG. 5 so that the DFVCM 100 would only stop RV battery 70 power when both conditions exist: (1) no 'ready' signal from the DC rectifier 50 and (2) engine RPMs are outside of an acceptable range. Other embodiments could use the logic in an 'OR' situation so that DFVCM 100 would stop RV battery 70 power when either condition exists: (1) no 'ready' signal from the DC rectifier 50 OR (2) engine RPMs are outside of an acceptable range. All arrangements would be within the scope of the invention.

Figure 6:
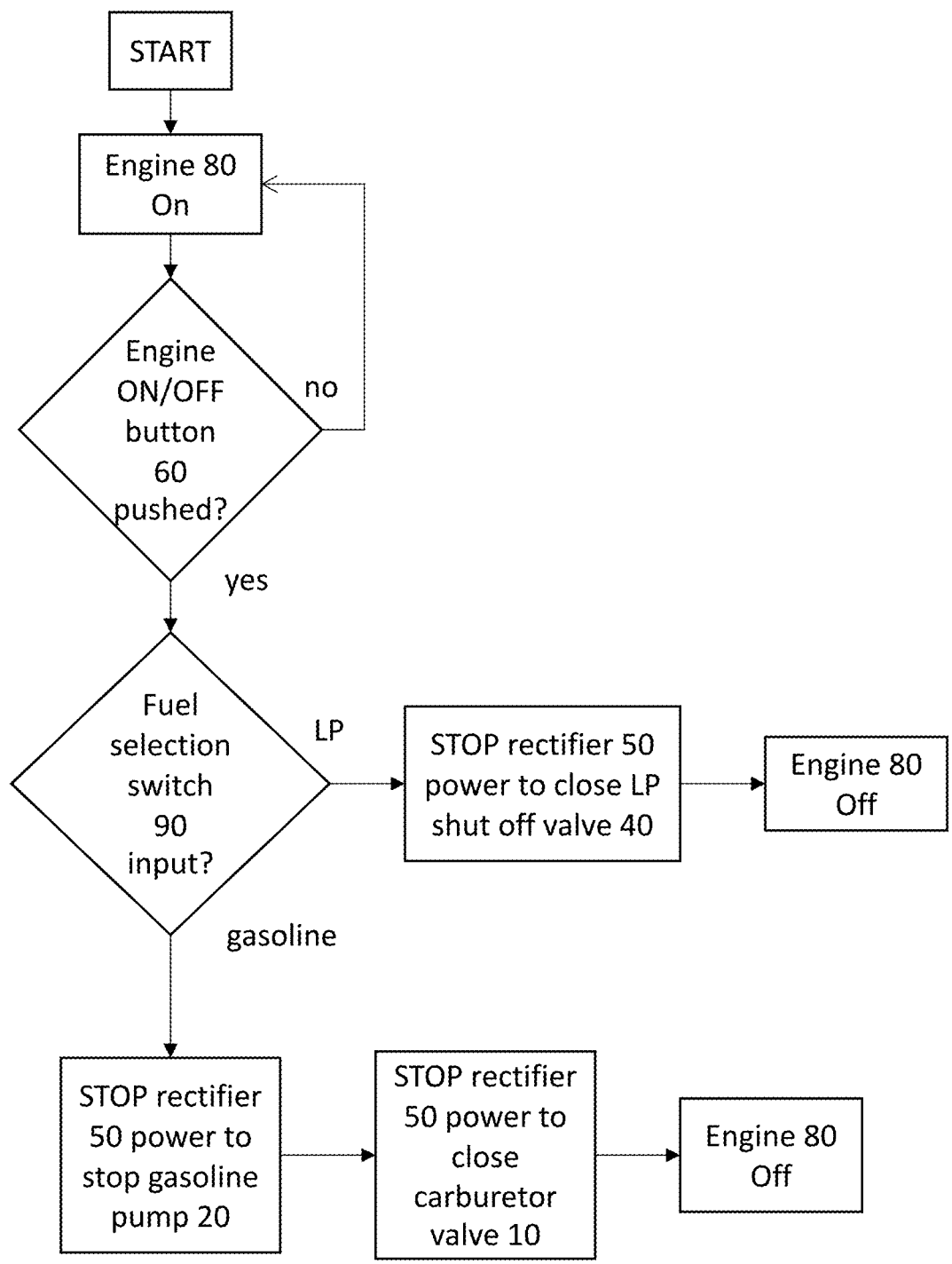
FIG. 6 is a logic flowchart for an exemplary embodiment of the software logic operating in the dual fuel valve control module when the user is stopping the engine.

FIG. 6 is a logic flowchart for an exemplary embodiment of the software logic operating in the DFVCM 100 when the user is stopping the engine 80 after power supply has transferred over to the DC rectifier 50. While the engine 80 is running, the DFVCM 100 checks to see if the engine on/off button 60 has been pushed. If not, the system takes no action and returns to check the status of the engine on/off button 60 again. If yes, the DFVCM 100 checks the fuel selection switch 90 to determine if LP gas or gasoline is selected as the fuel. If LP gas is selected, the DFVCM 100 would stop rectifier 50 power to the LP shut off valve 40 in order to stop all flow of LP gas into the engine 80. If gasoline is selected, the DFVCM 100 would stop rectifier 50 power to the gasoline pump 20 and carburetor valve 10 to stop all flow of gasoline into the engine 80.

Figure 7:
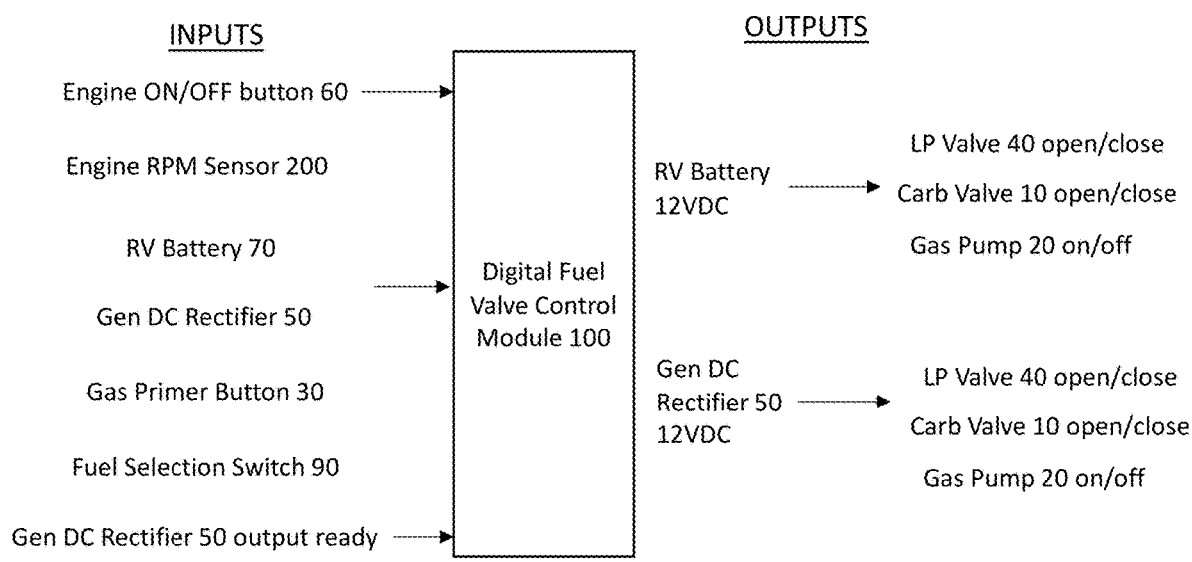
FIG. 7 is an electrical diagram of an exemplary embodiment of the input signals coming into the digital fuel valve control module as well as the output signals coming out of the digital fuel valve control module.

FIG. 7 is an electrical diagram of an exemplary embodiment of the input signals coming into the DFVCM 100 as well as the output signals coming out of the DFVCM 100. As shown, the DFVCM 100 accepts electrical communication from a number of different components and uses this to allocate the proper type of power to the desired components in the engine 80. In this embodiment, the inputs include: the engine on/off switch 60, RV battery 70 power, DC rectifier 50 power, gas primer button 30, fuel selection switch 90, optional engine RPM sensor 200, and optional DC rectifier 50 power output 'ready'. Each of these inputs is preferably supplied to the DFVCM 100 in 12 VDC. In response these inputs, the DFVCM 100 executes the logic shown and explained above in order to send either RV battery 70 power or DC rectifier 50 power to the appropriate engine component(s): LP valve 40 OR gas pump 20 and carburetor valve 10. The switching of power happens instantly and does not disrupt the firing of the engine 80 or generation of power by the stator assembly 190.

FIG. 8A is a software chart of the operation modes of the DFVCM 100 based on states of the engine 80 and the selection of gasoline from the dual fuel selection switch 90. When the engine 80 is off, the only components that can be utilized are the primer switch 30 which triggers RV battery 70 power to be sent to the gasoline pump 20. All other components are not used. When the engine 90 is starting, the primer switch 30 remains energized while the power from the RV battery 70 is now routed to both the gasoline pump 20 and the carburetor valve 10. Once the engine 80 is running, the power is no longer taken from the RV battery 70 but instead from the DC rectifier 50, which now supplies the power to the gasoline pump 20 and carburetor valve 10. Once the engine 80 is running, the primer switch 30 has no effect and is essentially turned off.

FIG. 8B is a software chart of the operation modes of the DFVCM 100 based on states of the engine 80 and the selection of LP gas from the dual fuel selection switch 90. When the engine 80 is off, the only component that is sending any electrical signals to the DFVCM 100 is the RV battery 70. All other components are not used. When the engine 90 is starting, the power from the RV battery 70 is now routed to open the LP shut off valve 40. Once the engine 80 is running, the power is no longer taken from the RV battery 70 but instead from the DC rectifier 50, which now supplies the power to the keep the LP shut off valve 40 open. Once the engine 80 is running, the primer switch 30 has no effect and is essentially turned off, whether in LP mode or gasoline mode.

As noted above, while starting the engine in the LP mode, the primer switch 30 is energized in case the user quickly switches fuel types at the switch 90 during the start process. In this way, gasoline priming begins immediately once the switch 90 changes to gasoline and the user maintains pressure on the primer switch 30.

As used herein, the phrase 'time period (T)' is used to represent any time period that allows the software logic to ensure that the data is steady and accurate. In some embodiments, the time period (T) would be on the order of 10-20 milliseconds. However, for other embodiments, it may be useful to have a longer time period (T) which might be on the order of 2-10 seconds.

While the term 'RV battery' has been used herein, the exemplary embodiments of the invention could be used with any type of battery storage for any type of vehicle, boat, house/apt, or stationary power storage/generation setups.

As used herein, the term "control module" is used to represent an electronic controller capable of executing software instructions for performing any of the features described herein. In some cases the controls are preferably microcontrollers, microprocessors, or CPU/RAM combination.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A dual fuel system with a recreational vehicle electric battery for use with a power generation assembly comprising:
   a combustion engine with a stator assembly for generating power and further having
      a gasoline pump,
      an LP shutoff valve positioned to control the flow of LP gas into a combustion chamber of the engine, and
      a carburetor valve positioned to control the flow of gasoline from the gasoline pump into a carburetor of the engine,
   a recreational vehicle battery;
   a DC rectifier in electrical communication with the stator assembly;
   a fuel selection switch accepting input for a desired fuel from a user;
   a digital fuel valve control module (DFVCM) in electrical communication with the gasoline pump, LP shutoff valve, carburetor valve, recreational vehicle battery, DC rectifier, and fuel selection switch; and
   a primer switch in electrical communication with the DFVCM wherein the DFVCM is adapted to send power from the recreational battery to the primer switch when starting the engine regardless of whether LP gas or gasoline is selected by the fuel selection switch.

2. The system of claim 1 wherein:
   the DFVCM is adapted to start the engine with power from the recreational vehicle battery and then switch to using DC rectifier power once the engine is successfully started.

3. The system of claim 1 wherein:
   the DFVCM is adapted to start the engine with a first fuel type and then switch to a second fuel type once the engine has successfully started.

4. The system of claim 1 wherein:
   the DFVCM is adapted to prevent any gasoline from entering the carburetor when LP gas is selected as the fuel type; and
   is further adapted to prevent any LP gas from entering a combustion chamber of the engine when gasoline is selected as the fuel type.

5. The system of claim 1 wherein:
   the DFVCM is adapted to start the engine with power from the recreational vehicle battery and then switch to using DC rectifier power to operate the engine once the DFVCM receives a 'ready' signal from the DC rectifier.

6. The system of claim 1 wherein:
   the LP shutoff valve and carburetor valve are normally closed valves such that when no power is applied both valves would prevent any fluid from passing through the valve.

7. The system of claim 1 further comprising:
   an AC filter and breaker box electrically connected to the stator assembly, where the breaker box delivers power to the recreation vehicle devices.

8. The system of claim 1 further comprising:
   an engine timing and control module electrically connected to the DFVCM, wherein the DFVCM is adapted to stop all fuel supply to the engine based on data from the engine timing and control module.

9. A dual fuel system with a recreational vehicle electric battery for use with a power generation assembly comprising:
   a combustion engine with a stator assembly for generating power and further having a gasoline pump,
      an LP shutoff valve positioned to control the flow of LP gas into a combustion chamber of the engine,
      a carburetor valve positioned to control the flow of gasoline from the gasoline pump into a carburetor of the engine, and
      an engine timing control module in electrical communication with an engine RPM sensor;
   a recreational vehicle battery;
   a DC rectifier in electrical communication with the stator assembly;
   a fuel selection switch accepting input for either LP gas or gasoline; and
   a digital fuel valve control module (DFVCM) in electrical communication with the gasoline pump, LP shutoff valve, carburetor valve, recreational vehicle battery, DC rectifier, fuel selection switch, and engine timing control module;
   wherein when starting the engine, the DFVCM is adapted to send power from the recreational vehicle battery to the engine timing control module in order to start the engine and simultaneously the DFVCM is adapted to send power from the recreational vehicle battery power to a primer switch, gasoline pump, and carburetor valve when the dual fuel switch indicates gasoline as the fuel source.

10. The system of claim 9 wherein:

when starting the engine, the DFVCM is adapted to send power from the recreational vehicle battery to the LP shutoff valve when LP gas is selected at the fuel selection switch, or send power from the recreational vehicle battery to the gasoline pump and carburetor valve when gasoline is selected at the fuel selection switch.

11. The system of claim 9 wherein:

once the engine has started, the DFVCM is adapted to send power from the DC rectifier to the LP shutoff valve only when the DFVCM receives a 'ready' signal from the DC rectifier and when LP gas is selected by the fuel selection switch.

12. The system of claim 9 wherein:

once the engine has started, the DFVCM is adapted to send power from the DC rectifier to the LP shutoff valve only when the DFVCM receives engine RPM data that is between a MIN and MAX RPM.

13. The system of claim 9 wherein:

once the engine has started, the DFVCM is adapted to send power from the DC rectifier to the LP shutoff valve only when the DFVCM receives engine RPM data that is between a MIN and MAX RPM and when the DFVCM receives a 'ready' signal from the DC rectifier.

14. The system of claim 9 further comprising:

a primer switch in electrical communication with the DFVCM and wherein the DFVCM is adapted to send power to the primer switch while starting the engine even when LP gas has been selected from the dual fuel selection switch.

15. A dual fuel system with a recreational vehicle electric battery for use with a power generation assembly comprising:

a combustion engine with a stator assembly for generating power and further having a gasoline pump, an LP shutoff valve positioned to control the flow of LP gas into a combustion chamber of the engine, a carburetor valve positioned to control the flow of gasoline from the gasoline pump into a carburetor of the engine, and an engine timing control module in electrical communication with an engine RPM sensor;

a recreational vehicle battery;

a DC rectifier in electrical communication with the stator assembly;

a gasoline primer button;

a fuel selection switch accepting input for either LP gas or gasoline; and a digital fuel valve control module (DFVCM) in electrical communication with the gasoline pump, LP shutoff valve, carburetor valve, recreational vehicle battery, DC rectifier, gasoline primer button, fuel selection switch, and engine timing control module; and wherein the DFVCM is adapted to transfer power from the recreational vehicle battery to the gasoline primer button when the engine is starting.

16. The system of claim 15 wherein the DFVCM is further adapted to send power to either (1) LP shutoff valve or (2) gasoline pump and carburetor valve, but never (1) and (2) simultaneously.

17. The system of claim 15 wherein:

the DFVCM is further adapted to switch instantly from powering the LP shutoff valve to powering the gasoline pump and carburetor valve, while the engine continues to run.

18. The system of claim 15 wherein:

the DFVCM is further adapted to stop all power to the LP shutoff valve, gasoline pump, and carburetor valve if the engine RPM sensor indicates an RPM that is either above a MAX or below a MIN for a time (T).

* * * * *